(12) United States Patent
Woodworth et al.

(10) Patent No.: US 11,856,040 B1
(45) Date of Patent: Dec. 26, 2023

(54) DYNAMIC REMEDIATION OF PLUGGABLE STREAMING DEVICES

(71) Applicant: CenturyLink Intellectual Property LLC, Broomfield, CO (US)

(72) Inventors: John R. B. Woodworth, Amissville, VA (US); Dean Ballew, Sterling, VA (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

(21) Appl. No.: 18/329,771

(22) Filed: Jun. 6, 2023

Related U.S. Application Data

(60) Provisional application No. 63/366,105, filed on Jun. 9, 2022.

(51) Int. Cl.
| | | |
|---|---|---|
| *H04L 65/61* | (2022.01) | |
| *H04L 65/80* | (2022.01) | |
| *H04N 21/242* | (2011.01) | |
| *G06T 7/00* | (2017.01) | |

(52) U.S. Cl.
CPC ............ *H04L 65/61* (2022.05); *G06T 7/0002* (2013.01); *H04L 65/80* (2013.01); *H04N 21/242* (2013.01); *G06T 2207/10016* (2013.01); *G06T 2207/30168* (2013.01)

(58) Field of Classification Search
CPC ....... H04L 65/61; H04L 65/80; G06T 7/0002; G06T 2207/10016; G06T 2207/30168; H04N 21/242
See application file for complete search history.

(56) References Cited

U.S. PATENT DOCUMENTS

| | | | |
|---|---|---|---|
| 10,080,061 B1* | 9/2018 | Kirley | H04N 21/4852 |
| 10,108,254 B1* | 10/2018 | Kammerl | G11B 27/034 |
| 11,451,855 B1* | 9/2022 | Kirley | H04W 4/80 |
| 2007/0276670 A1* | 11/2007 | Pearlstein | H04N 21/43072 704/270 |
| 2010/0295993 A1* | 11/2010 | Oh | H04N 21/4341 348/E5.011 |
| 2012/0120314 A1* | 5/2012 | Yang | H04N 17/004 348/E9.034 |
| 2017/0150141 A1* | 5/2017 | Yang | H04N 21/43072 |
| 2021/0195281 A1* | 6/2021 | Zhao | H04N 21/8106 |
| 2022/0351365 A1* | 11/2022 | Fowler | G06T 7/0008 |

* cited by examiner

*Primary Examiner* — Javier O Guzman

(57) ABSTRACT

The present disclosure describes a system and method for providing dynamic remediation of a pluggable streaming device issue, such as a customer premises equipment (CPE) device. Sometimes, various features of the CPE device to begin to fail. For example, synchronization of the audio and video streams may drift, media rental purchases may time out, or playback may throttle to low quality. Such failures can be caused by device or network issues. The present disclosure describes a CPE remediation system that operates to identify a failure associated with playing media streamed by the CPE device. The CPE remediation system may further determine a solution to remediate an observed CPE device-related failure. In some examples, the CPE remediation process may further provide or perform one or more actions included in the determined solution. In some examples, the solution may include a warm or a cold reboot.

18 Claims, 4 Drawing Sheets

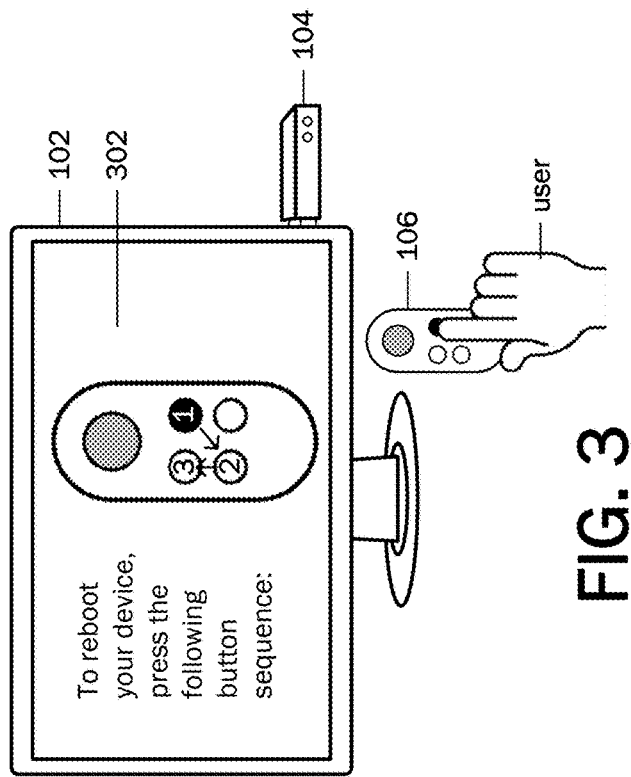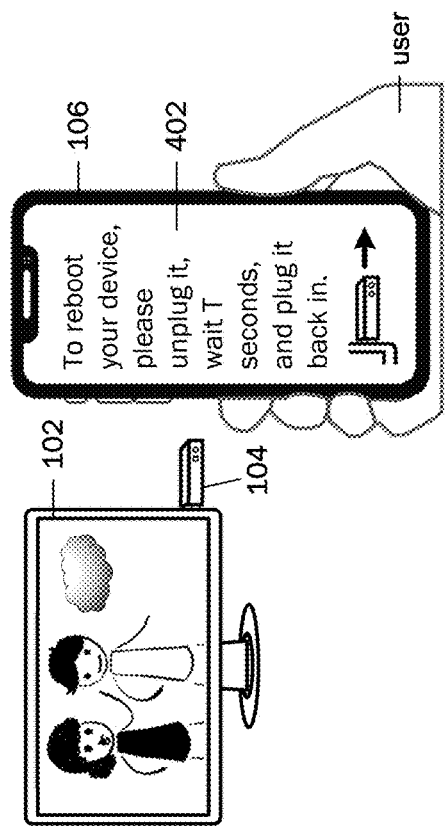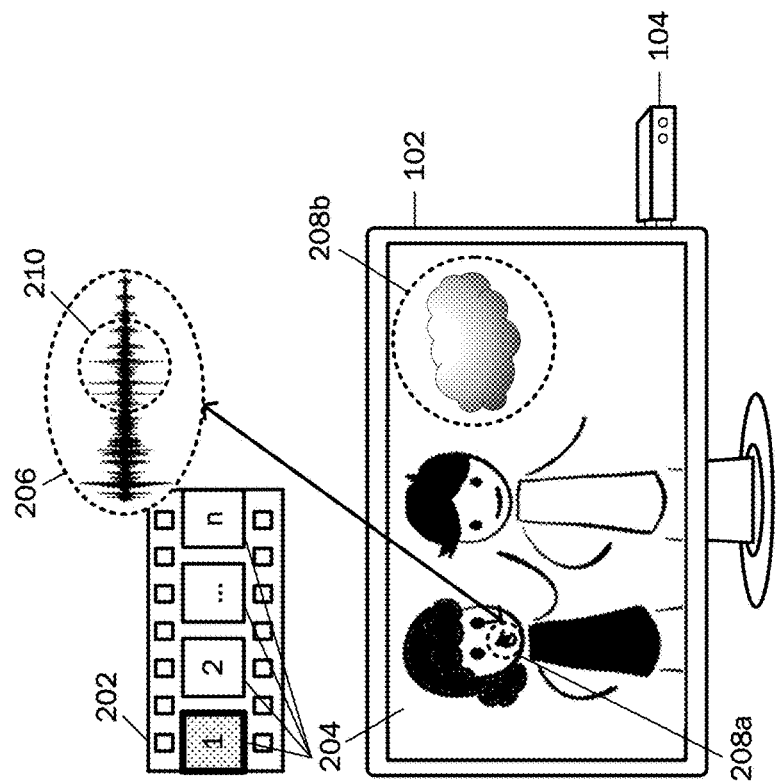

US 11,856,040 B1

DYNAMIC REMEDIATION OF PLUGGABLE STREAMING DEVICES

CROSS-REFERENCE TO RELATED APPLICATIONS

This application claims the benefit of U.S. Provisional Application No. 63/366,105 filed Jun. 9, 2022, entitled "Dynamic Remediation of Pluggable Streaming Devices," which is incorporated herein by reference in its entirety.

BACKGROUND

Today's entertainment and multimedia ecosystem includes many set-top and pluggable "stick" devices. Many of these devices operate over long periods of time, oftentimes even when not being used. For example, such devices may remain running to maintain responsiveness. Over time, features may begin to fail, oftentimes in non-obvious ways. For example, audio-video synchronization may drift, media rental purchases may time out, or playback may throttle to very low quality. Each example may point to network or account issues and are likely to cause further frustration if not addressed.

It is with respect to this general technical environment that aspects of the present technology disclosed herein have been contemplated. Furthermore, although a general environment is discussed, it should be understood that the examples described herein should not be limited to the general environment identified herein.

SUMMARY

The present disclosure describes a system and method for providing dynamic remediation of pluggable streaming device issues according to an example. Accordingly, among other things, aspects of the present disclosure include a method for providing dynamic remediation of a pluggable streaming device issue, comprising: receiving, at a playback device, media content from a separate customer premises equipment (CPE) device; analyzing, by the playback device, a portion of media content; identifying an occurrence of a failure corresponding to playing the portion of media content; determining a solution for the failure; and automatically causing one or more actions included in the solution to be performed to dynamically remediate the failure.

Aspects of the present disclosure further include a system for providing dynamic remediation of a pluggable streaming device issue, comprising: at least one processor; and memory storing instructions that, when executed by the at least one processor, cause the system to: receive, at a playback device, media content from a separate customer premises equipment (CPE) device; analyze, by the playback device, a portion of media content; identify an occurrence of a failure corresponding to playing the portion of media content; determine a solution for the failure; and automatically cause one or more actions included in the solution to be performed to dynamically remediate the failure.

Aspects of the present disclosure further include a smart television device for providing dynamic remediation of a pluggable streaming device issue, comprising: at least one processor; and memory storing instructions that, when executed by the at least one processor, cause the system to: receive, at the smart television device, media content from a separate customer premises equipment (CPE) device; analyze, using an artificial intelligence/machine learning (AI/ML), a portion of media content streamed; identify an occurrence of a CPE device-related failure corresponding to playing the portion of media content; determine a solution for the CPE device-related failure; and automatically cause one or more actions included in the solution to be performed to dynamically remediate the CPE device-related failure.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

FIG. 2 is an illustration of example video content streamed by a customer premises equipment (CPE) device and played on a playback device.

FIG. 3 is an illustration of an example message corresponding to remediating a CPE device failure displayed on a screen of the playback device.

FIG. 4 is an illustration of another example message corresponding to remediating a CPE device failure displayed on a screen of a user device.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As mentioned above, the CPE device may operate over long periods of time. This, among other reasons, can cause various features of the CPE device to begin to fail. Some features may start to fail in ways that are not obvious to a user, but which may further develop into more obvious failures if left unresolved. For example, synchronization of the audio and video streams may drift, media rental purchases may time out, or playback may throttle to low quality. Such example failures can be caused by either device or network (e.g., WAN or LAN) issues of which the user is likely not aware. Accordingly, such failures are likely to cause further frustration and may drive network or TV device-related trouble tickets. In order to address the above and other aspects, the present disclosure describes a CPE remediation system that operates to identify a failure associated with playing media streamed by the CPE device. The CPE remediation system may further determine a solution to remediate an observed CPE device-related failure. In some examples, the CPE remediation process may further provide or perform one or more actions included in the determined solution. These and other examples will be explained in more detail below with respect to FIGS. 1-6. It will be appreciated that the examples shown by the figures and described herein may be used across the various implementations described herein.

Figure 1:
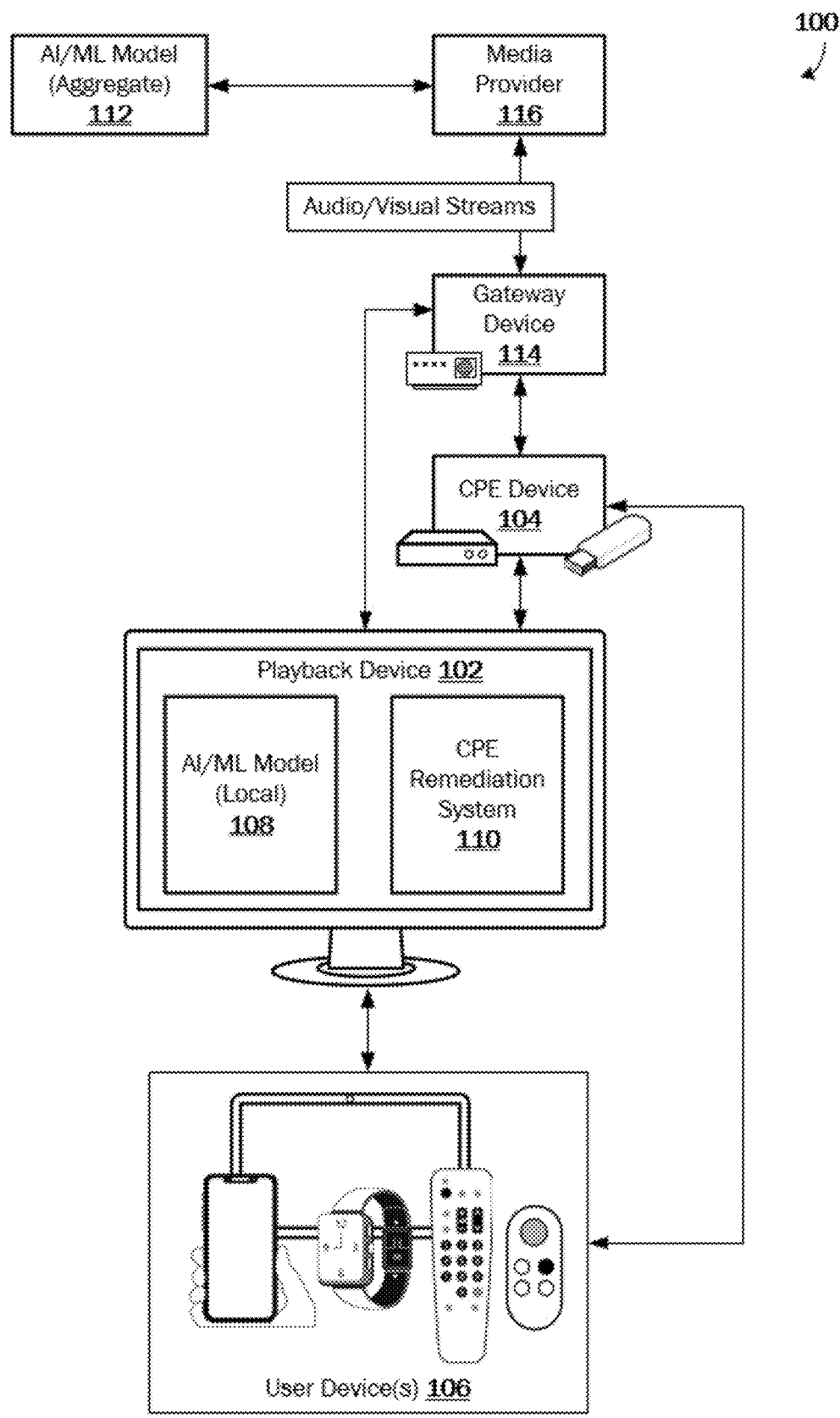
FIG. 1 illustrates an example system for providing dynamic remediation of pluggable streaming device issues in accordance with an embodiment.

FIG. 1 illustrates an example system 100 in which providing dynamic remediation of pluggable streaming device issues can be implemented according to an example. In the example shown in FIG. 1, the system 100 includes a customer premises equipment (CPE) device 104 connected to a separate playback device 102 (such as a smart television (TV) or other monitor or display device capable of displaying a media stream). The CPE device 104 can be one of various types of devices that receives media content (e.g., from one or more media providers 116) and provides the media content to the playback device 102 for display/play/playback. Media content may include audio and video streams of live video, on-demand video, game content, or other types of media content. In examples, the CPE device 104 is a box-style device, a stick-style device, a console device, or the like. The CPE device 104 may include one or more streaming channels or applications that are configured to receive and play streams of media content. In some examples, one or more of the streaming applications can consume a subset of a total piece of media content and play the included audio and video to be presented to a user (e.g., in real-time, live, or on-demand).

In one example implementation, the CPE device 104 connects to the playback device 102 via a High-Definition Multimedia Interface (HDMI) cable. For instance, the CPE device 104 may include an HDMI port that receives the HDMI cable that connects to an HDMI port of the playback device 102. Or, when the CPE device 104 is embodied as a stick-style device, the CPE device 104 may plug directly into an HDMI port of the playback device 102. The CPE device 104 can connect to the playback device 102 via other ways known in the art in other example implementations.

The CPE device 104 is further communicatively connected to a gateway device 114. For example, the gateway device 114 (e.g., a router or router/modem combination) connects various local devices (e.g., the CPE device 104, the playback device 102, one or more types of user devices 106) to a wide area network (WAN) that allows access to one or more media providers 116 and other network resources. In some examples, the gateway device 114 further operates as a router that provides a wireless local area network (LAN) at the premises, which the various devices may connect to wirelessly. In other examples, the various devices may connect to the gateway device 114 via a wired LAN connection (e.g., ethernet). For instance, a media provider 116 may be connected to a WAN (e.g., the Internet), and the CPE device 104 may receive audio/video streams from the media provider 116 via the gateway device 114.

As mentioned above, the CPE device 104 may operate over long periods of time. This, among other reasons, can cause various features of the CPE device 104 to begin to fail. Accordingly, the present disclosure provides a CPE remediation system 110 that operates to identify a failure associated with playing media streamed by the CPE device 104. In some examples, the CPE remediation system 110 further determines whether the failure is caused by a CPE device-related issue or a network (e.g., WAN or LAN) related issue. In an example implementation, the CPE remediation system 110 may further determine a solution to resolve the failure and provide the solution to the CPE device 104. For instance, the solution may include instructions that cause the CPE device 104 to perform one or more various actions that dynamically remediate the failure.

In an example implementation and as illustrated in FIG. 1, the CPE remediation system 110 is included in the playback device 102. For instance, by operating on the playback device 102, the CPE remediation system 110 is enabled to evaluate the CPE device's performance as a bystander to the CPE device 104. Thus, processing and memory resources required to perform the evaluation of the CPE device 104 are distributed to another device (i.e., the playback device 102). This may be particularly useful when the CPE device 104 is experiencing a failure and where additional processing, such as to perform the evaluation, may cause further failure of the CPE device 104.

In some examples, the CPE remediation system 110 analyzes a portion of media content (e.g., audio and video streams) streamed by the CPE device 104 and played by the playback device 102 to identify an audio and video (A/V) synchronization-related failure, if any. In some examples, the CPE remediation system 110 uses an artificial intelligence (AI)/machine learning (ML) model 108 to compare the video and the audio of the played media content for determining an occurrence of an A/V synchronization-related failure. For instance, the AI/ML model 108 may include a facial tracking model for A/V synchronization estimation based on an assessment of one or a combination of A/V synchronization metrics. As an example, the CPE remediation system 110 uses the AI/ML model 108 and facial tracking to identify A/V synchronization-related failure by identifying and comparing cues, such as lip movements to identifiable portions of the audio streams. As another example, the CPE remediation system 110 uses the AI/ML model 108 to identify and compare a visual cue that can be timed with audio, such as an explosion with an expected percussion, to determine whether an A/V synchronization-related failure (e.g., drift) has occurred. For instance, an A/V synchronization-related failure may be determined when a distinction (e.g., a time difference, such as in milliseconds (ms)) is observed between audio (e.g., speaking) and corresponding video presentation of an identifiable visual cue (e.g., lip movements of a person).

In some examples, if timestamps are included in the video content streamed by the CPE device 104, the CPE mediation processor 110 compares the timestamps of a portion of an audio stream and a portion of a video stream of media content played by the playback device 102 to determine whether an A/V synchronization-related failure has occurred. For instance, an A/V synchronization-related failure may be determined when the timestamps of the audio stream and video stream do not match or are off by at least a threshold amount.

In some examples, the CPE remediation system 110 samples audio and video streams at various times of playing video content. For instance, the various times can include when the playback device 102 starts playing the video content and periodically during play of the video content. Periodic analysis of played video content may enable the CPE remediation system 110 to determine whether an A/V synchronization-related failure fluctuates. In some examples, the CPE remediation system 110 may determine whether an A/V synchronization-related failure fluctuates based on analysis of low-action versus high-action scenes (e.g., where low-action and high-action scenes are determined based on a rate of pixel change). For instance, an A/V synchronization-related failure that is observed to "catch up"

in a low-action scene and lag in a high-action scene may indicate an issue with the CPE device 104 (e.g., a central processing unit (CPU) or processing issue).

In some examples, the CPE mediation processor 110 uses the AI/ML model 108 to analyze a portion of media content (e.g., video streams) streamed by the CPE device 104 and played by the playback device 102 to identify a video quality-related failure, if any. For example, the AI/ML model 108 may include one or more video quality assessment models for estimating video quality based on an assessment of one or a combination of image and/or video quality metrics. For instance, the CPE mediation processor 110 may analyze pixel sizes, gradients, compression indications in metadata or protocol messages, etc., to determine whether the quality of the video of the media content is reduced.

In some examples, the CPE mediation processor 110 performs a network speed test to determine whether a failure related to playing media content streamed by the CPE device 104 may be caused by a network issue. For example, the CPE mediation processor 110 may test the speed of the WAN network connection (e.g., between the gateway device 114 and a server component) by communicating with a network-connected server via the gateway device 114 and testing the speed of a reply. In some examples, the CPE mediation processor 110 is configured to communicate with the gateway device 114. For instance, the CPE mediation processor 110 may request the gateway device 114 to perform a LAN (e.g., WIFI) speed test. The CPE mediation processor 110 may analyze the WAN and/or LAN speed test results to determine whether the download speed of the WAN or the LAN meet a minimum threshold download speed for playing the media content without loss of video quality, lag, or other network-related failures. As should be appreciated, other analyses of media content streamed by the CPE device 104 for detecting failures are possible and are within the scope of the present disclosure.

In some examples, the AI/ML model 108 is a local model that operates on the playback device 102. In other examples, the CPE remediation system 110 is in communication with an aggregate AI/ML model 112 that is located remotely (e.g., on a network server). For instance, the aggregate AI/ML model 112 may be configured to receive information related to detected failures and the CPE device or network issues corresponding to the failures from a plurality of local AI/ML models 108. The aggregate AI/ML model 112 may be used to analyze the information and determine patterns associated with failures and may update the AI/ML model 108 on a periodic or other basis. For instance, a determined pattern may be related to a particular type or model of CPE device 104. Another example determined pattern may be related to location, video content, advertisement, or another detectable attribute. Potential solutions to historically identified patterns may also be stored in or with the AI/ML models 108 and/or 112 or may be determined by the CPE remediation system 110 based on anomalies identified by the models. For instance, one or more actions to include in a solution for a failure may be determined based on a determined pattern. The solution may then be communicated to, or determined by, the CPE remediation system 110 to implement the solution (e.g., one or more actions to perform) to dynamically remediate the corresponding failure when the failure is observed.

In some examples, the solution to remediate an observed CPE device-related failure includes performing a "warm" or "cold" reboot of the CPE device 104. A "warm" reboot may include resetting one or more applications running on the CPE device 104. As an example, a "warm" reboot may include reinitializing a video processing subsystem (including an A/V interface) of the CPE device 104. A "warm" reboot, for example, may be faster and more efficient to perform than a "cold" reboot, which may include powering off the CPE device 104, waiting, and powering the CPE device 104 back on. For instance, a "cold" reboot may entail obtaining a new IP (Internet Protocol) address for the CPE device 104 from the LAN or WAN network.

In some examples, the solution may at least partially be performed by a user. For instance, an action included in the solution may cause the CPE remediation system 110 to provide a message for display to a user indicating user actions to perform for initiating a "warm" or "cold" reboot of the CPE device 104. In some examples, the message is displayed by the playback device 102. In other examples, the message is transmitted to a separate user device 106, such as a mobile phone, a tablet, a wearable device, remote control, etc., via one or more communication methods (e.g., BLUETOOTH, WI-FI, infrared). The user, in some examples, may manually disconnect and reconnect power to the CPE device 104. In some examples, the user is able to initiate the "warm" or "cold" reboot of the CPE device 104 via the user device 106. As an example, a selection may be made via an option included in an application operating on the user's mobile device or a sequence of buttons on a remote-control device in communication with the CPE device 104, which may cause the CPE device 104 to perform the "warm" or "cold" reboot.

In some examples, the solution may be performed by the CPE device 104. For instance, the CPE device 104 may include callable functions, which, when executed, cause the CPE device 104 to perform a "warm" or "cold" reboot. For instance, the CPE remediation system 110 may send instructions to the CPE device 104 to perform the "warm" or "cold" reboot via executing one or more functions. As an example, the CPE device 104 may power off and back on via a software-controlled power function.

In some examples, the solution is initiated by the CPE remediation system 110. For instance, the CPE remediation system 110 may use a protocol to initiate a full reset of the CPE device 104 over the HDMI connection between the playback device 102 and the CPE device 104. That is, the CPE remediation system 110 can use the protocol to disconnect and reconnect power supplied to the CPE device 104 via the HDMI connection. Performing the solution may dynamically remediate the failure. As should be appreciated, other solutions for dynamically remediating detecting failures are possible and are within the scope of the present disclosure.

With reference now to FIG. 2, an illustration of example media content 202 streamed by a CPE device 104 and played on a playback device 102 is shown. The media content 202 includes a video stream 204 and an audio stream 206. For example, the CPE remediation system 110 may analyze a first portion 208a of the video stream 204 and a corresponding portion of the audio stream 206 (e.g., an audio stream portion 210) to determine whether a failure is observed. According to an example, the CPE remediation system 110 may use the AI/ML model 108 to analyze lip movements included in the first portion 208a of the video stream 204 in comparison with a voice print included in the audio stream portion 210 to determine whether the lip movements and voice point are synchronized at least within a threshold. When the lip movements and voice point are not sufficiently synchronized with the threshold, an A/V synchronization-related failure may be detected.

In some examples, the CPE remediation system 110 may additionally or alternatively analyze a second portion 208b of the video stream 204 to determine whether a failure is observed. According to an example, the CPE remediation system 110 may use the AI/ML model 108 to compute an objective quality measurement of the second portion 208b of the video stream 204 (e.g., using one or a combination of video quality assessment metrics) to determine whether a quality of the displayed video stream 204 is within a threshold. For instance, when blockiness or blurriness issues or other video quality artifacts are observed, a video quality-related failure may be detected. In some examples, the CPE remediation system 110 may further perform a network (WAN) speed test for determining whether a detected failure may be related to a WAN issue. In some examples, the CPE remediation system 110 may further request a LAN performance-related information from the gateway device 114 for determining whether a detected failure may be related to a LAN issue.

In some examples, the AI/ML model 108 may receive or be updated with information associated with patterns learned from aggregated AI/ML data. For instance, the aggregate AI/ML model 112 may learn patterns related to failures and/or solutions and provide information related to the learned patterns to the local AI/ML model 108. The information related to the learned patterns may enable the CPE remediation system 110 to identify additional failures and/or determine solutions to failures.

With reference now to FIG. 3, an illustration of an example message 302 displayed on a screen of the playback device 102 of FIG. 2 is shown. For instance, the message 302 includes instructions for a user of the playback device 102 to follow to dynamically remediate a failure detected by the CPE remediation system 110. For instance, the failure may be determined to be related to the CPE device 104. The CPE remediation system 110 may determine a solution for the failure and cause instructions for performing one or more steps of the solution to be included in the message 302 and displayed on the screen of the playback device 102. For example, the instructions may include a button sequence for the user to select to cause the CPE device 104 to perform a "cold" or "warm" reboot or another remediation process. As another example, the CPE device 104 or the CPE remediation system 110 may automatically perform one or more steps of the solution, and the message 302 may notify the user, for example, that the CPE device 104 will automatically reboot the next time the playback device 102 is powered down.

With reference now to FIG. 4, an illustration of another example message 402 displayed on a screen of a user device 106 (e.g., a mobile phone) is shown. For instance, the message 402 includes instructions for a user of the playback device 102 to follow to dynamically remediate a CPE device-related failure detected by the CPE remediation system 110. In an example, the message 402 may be initiated by the CPE remediation system 110 and transmitted to the user device 106 via one of various communication methods. As can be appreciated, in other examples, different or no messages may be provided.

Figure 5:
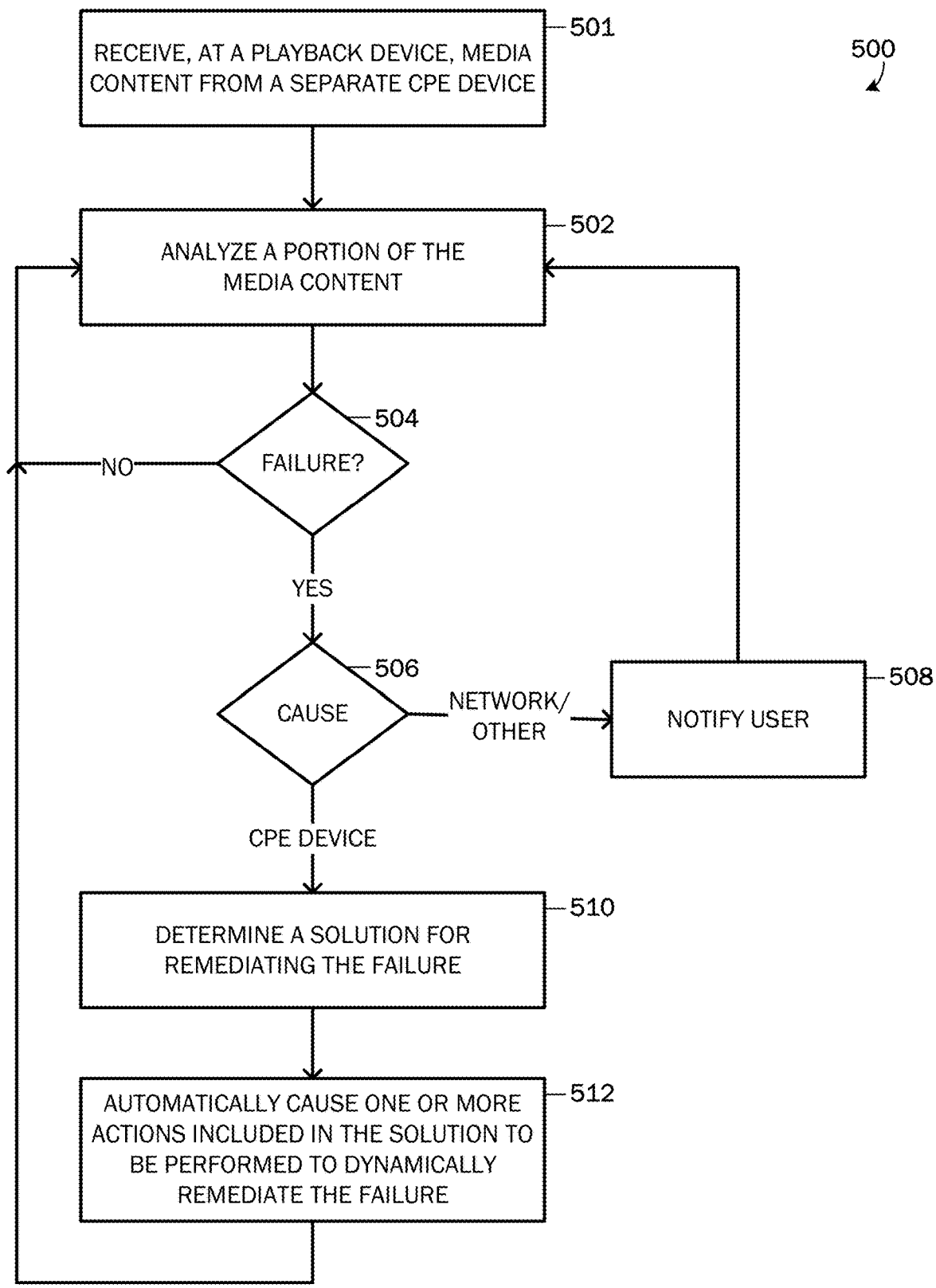
FIG. 5 illustrates an example method for providing dynamic remediation of pluggable streaming device issues in accordance with an embodiment.

With reference now to FIG. 5, a method 500 of example operations for providing dynamic remediation of pluggable streaming device issues is shown in accordance with an embodiment. For example, one or more of the operations may be performed by the CPE remediation system 110. At operation 502, a portion of media content (e.g., media content 202) streamed by a CPE device (e.g., CPE device 104) to a connected playback device (e.g., playback device 102) is analyzed. For instance, the media content 202 is played by the playback device 102, where a video stream 204 is displayed on a screen of the playback device 102 and an audio stream 206 is played through a speaker included in or connected to the playback device 102. In one example, the portion of media content 202 is analyzed when the media content 202 starts to play. In another example, the CPE remediation system 110 analyzes the portion of media content 202 at another one or more time periods during play of the media content 202. The CPE remediation system 110 may use one or a combination of assessment models included in the AI/ML model 108 to estimate A/V synchronization, video quality, and/or other metrics associated with assessing play of the media content 202.

At decision operation 504, a determination is made as to whether a failure is observed based at least on the analysis at operation 502. For instance, when a determination is made that an A/V synchronization, video-quality, or other related failure has occurred or is likely to occur, at decision operation 506, a determination may be made as to the likely cause of the failure, e.g., whether the failure is likely caused by an issue with the CPE device 104, a network issue, or another issue. In some examples, the CPE remediation system 110 may perform a network (WAN) speed test for determining whether a detected failure may be related to a WAN issue. In some examples, the CPE remediation system 110 may further request a LAN performance-related information from the gateway device 114 for determining whether a detected failure may be related to a LAN issue. For example, if the speed test result(s) indicate that the WAN and/or LAN are/is operating at a level sufficient for streaming the media content 202 at an expected level of quality or performance, a determination may be made that the failure is likely caused by the CPE device 104. When a CPE device-related failure is determined, the method 500 may proceed to operation 510. Alternatively, if a WAN or LAN related failure is determined, the method 500 may proceed to operation 508, where, in some examples, a notification may be provided to the user and/or a network administrator. For instance, the notification may include a message notifying the user that any video quality, A/V synchronization, or other failures related to playing the media content 202 may be likely caused by WAN or LAN issues. In some examples, a suggestion to disconnect the gateway device 114 from power, waiting, and reconnecting the gateway device 114 to power may be included in the message. The method 500 may return to operation 502, where, in some examples, another portion of media content 202 may be analyzed.

At operation 510, a solution for remediating the observed failure may be determined. For example, the solution may include one or more actions that may be performed by a user, the CPE device 104, or the CPE remediation system 110. At operation 512, one or more of the actions included in the solution may be performed and/or provided by the CPE remediation system 110. For example, the solution may include providing a message to display to the user, where the message may include one or more actions for the user to perform to remediate the failure. In another example, the solution may include instructing the CPE device 104 to perform a "cold" or a "warm" reboot. For instance, the reboot may be performed automatically, upon receiving consent from the user, when the playback device 102 is powered down, or at another time. In another example, the solution may include automatically initiating a full reset of the CPE device 104 over the HDMI connection between the playback device 102 and the CPE device 104. Other example solutions may be determined and performed. The method 500 may return to operation 502, where, in some examples, another portion of media content 202 may be analyzed. Accordingly, dynamic remediation of CPE device failures may be provided.

Figure 6:
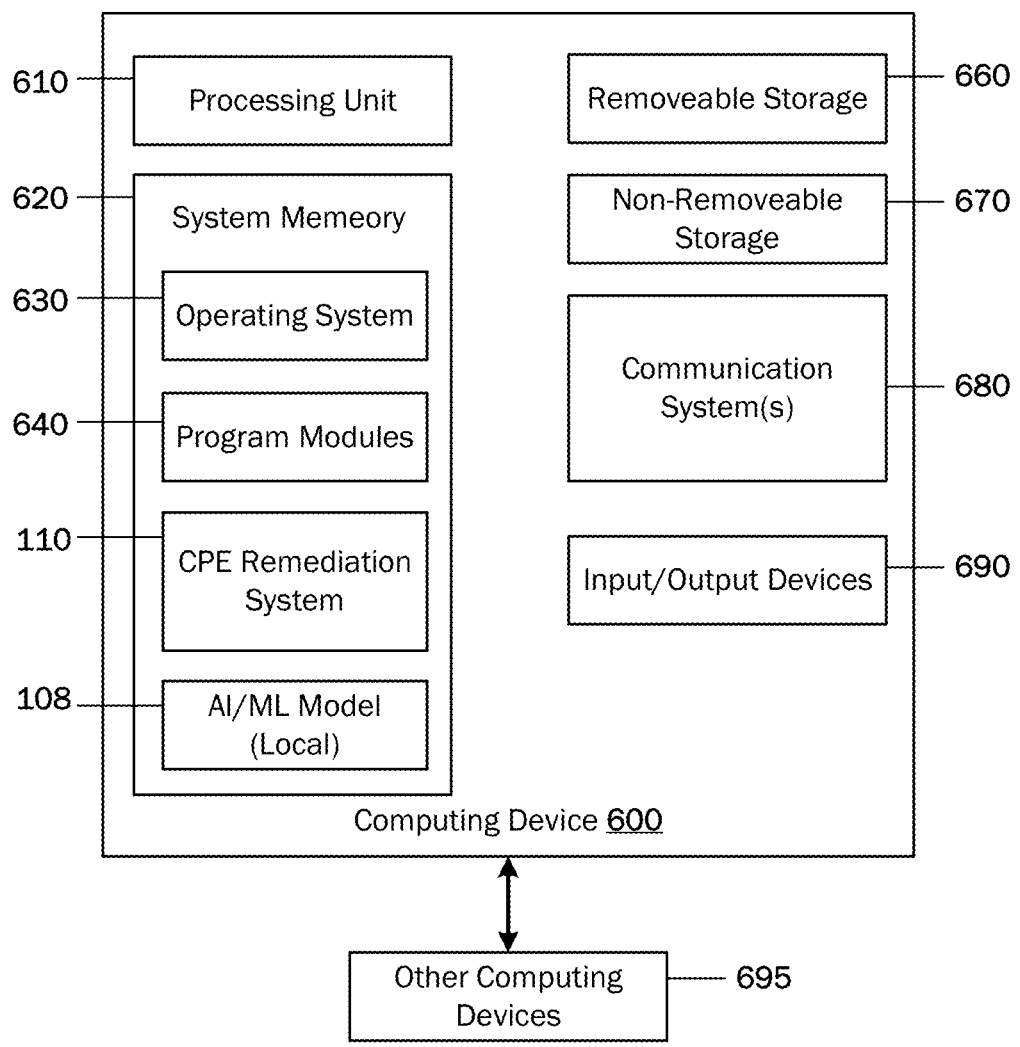
FIG. 6 is a block diagram of a computing device with which one or more aspects of the disclosure may be implemented in accordance with an embodiment.

FIG. 6 is a system diagram of a computing device 600 according to an example. The computing device 600, or various components and systems of the computing device 600, may be integrated or associated with the playback device 102. As shown in FIG. 6, the physical components (e.g., hardware) of the computing device 600 are illustrated and these physical components may be used to practice the various aspects of the present disclosure.

The computing device 600 may include at least one processing unit 610 and a system memory 620. The system memory 620 may include, but is not limited to, volatile storage (e.g., random access memory), non-volatile storage (e.g., read-only memory), flash memory, or any combination of such memories. The system memory 620 may also include an operating system 630 that controls the operation of the computing device 600 and one or more program modules 640. A number of different program modules 640 and data files may be stored in the system memory 620. While executing on the processing unit 610, the program modules 640 may perform the various processes described above. One example program module 640 may include the CPE remediation system 110 and the local AI/ML model 108 described above.

The computing device 600 may also have additional features or functionality. For example, the computing device 600 may include additional data storage devices (e.g., removable and/or non-removable storage devices) such as, for example, magnetic disks, optical disks, or tape. These additional storage devices are labeled as a removable storage 660 and a non-removable storage 670.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 6 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 600 on the single integrated circuit (chip). The disclosure may also be practiced using other technologies capable of performing logical operations such as, for example, AND, OR, and NOT, including but not limited to mechanical, optical, fluidic, and quantum technologies.

The computing device 600 may include one or more communication systems 680 that enable the computing device 600 to communicate with other computing devices 695 such as, for example, routing engines, gateways, signing systems and the like. Examples of communication systems 680 include, but are not limited to, the mobile device communication system 109 or the customer device communication system 105 described above, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 600 may also have one or more input devices and/or one or more output devices shown as input/output devices 690. These input/output devices 690 may include a keyboard, a sound or voice input device, haptic devices, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 620, the removable storage 660, and the non-removable storage 670 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal and may comprise tangible, non-transitory computer storage media.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for providing dynamic remediation of a pluggable streaming device issue, comprising: receiving, at a playback device, media content from a separate customer premises equipment (CPE) device; analyzing, by the playback device, a portion of media content; wherein analyzing the portion of media content comprises using an artificial intelligence/machine learning (AI/ML) model to analyze the portion of media content; identifying an occurrence of a failure corresponding to playing the portion of media content; determining a solution for the failure; and automatically causing one or more actions included in the solution to be performed to dynamically remediate the failure.

2. The method of claim 1, further comprising updating the AI/ML model based on learned failure patterns by an aggregate AI/ML model.

3. The method of claim 1, wherein analyzing the portion of media content comprises:
comparing a visual cue included in a video stream of the portion of media content to an identifiable portion of audio included in an audio stream of the portion of media content; and
determining the occurrence of a failure when the visual cue is out of synch with the identifiable portion of audio.

4. The method of claim 1, wherein analyzing the portion of media content comprises:
assessing a video stream of the portion of media content using a video quality assessment model to estimate video quality of the portion of media content; and
determining the occurrence of a failure when the estimated video quality is below a video quality metric threshold.

5. The method of claim 1, further comprising performing a network speed test to determine whether the occurrence of the failure is caused by a network related issue based on results of the network speed test.

6. The method of claim 1, further comprising requesting a network gateway device to perform a network speed test of a local network to which the CPE device is connected to determine whether the occurrence of the failure is caused by a local network-related issue based on results of the network speed test.

7. The method of claim 1, wherein analyzing the portion of media content comprises analyzing a plurality of portions of media content.

8. The method of claim 1, wherein determining the solution for the issue includes:
a warm reboot of the CPE device; or
a cold reboot of the CPE device.

9. The method of claim 8, wherein providing one or more actions included in the solution comprises automatically providing instructions to the CPE device to:
reset one or more applications running on the CPE device; or
power off, wait, and power back on.

10. The method of claim 9, wherein providing instructions to the CPE device to power off and power back on include instructions to power off and back on via a software-controlled power function.

11. The method of claim 8, wherein providing one or more actions included in the solution comprises displaying instructions on a screen of the playback device for display to a user.

12. The method of claim 8, wherein providing one or more actions included in the solution comprises transmitting a message including instructions to a user device for display to a user.

13. The method of claim 8, wherein performing one or more actions included in the solution comprises resetting the CPE device by interrupting power supplied to the CPE device by the playback device via an HDMI connection.

14. A system for providing dynamic remediation of a pluggable streaming device issue, comprising: at least one processor; and memory storing instructions that, when executed by the at least one processor, cause the system to: receive, at a playback device, media content from a separate customer premises equipment (CPE) device; analyze, by the playback device, a portion of media content; wherein the instructions cause the system to analyze the portion of media content using an artificial intelligence/machine learning (AI/ML) model to analyze the portion of media content; identify an occurrence of a failure corresponding to playing the portion of media content; determine a solution for the failure; and automatically cause one or more actions included in the solution to be performed to dynamically remediate the failure.

15. The system of claim 14, wherein the occurrence of a failure comprises:
an audio and visual stream synchronization failure; or
a video quality failure.

16. The system of claim 14, wherein one or more actions included in the solution comprises includes:
resetting one or more applications running on the CPE device; or
powering the CPE device off, waiting, and powering the CPE device back on.

17. The system of claim 14, wherein:
in providing the one or more actions, the instructions cause the system to:
display instructions on a screen of the playback device for display to a user; or
transmit a message including instructions to a user device for display to a user; and
in performing the one or more actions, the instructions cause the system to reset the CPE device by interrupting power supplied to the CPE device by the playback device via an HDMI connection.

18. A smart television device for providing dynamic remediation of a pluggable streaming device issue, comprising:
at least one processor; and
memory storing instructions that, when executed by the at least one processor, cause the system to:
receive, at the smart television device, media content from a separate customer premises equipment (CPE) device;
analyze, using an artificial intelligence/machine learning (AI/ML), a portion of media content streamed;
identify an occurrence of a CPE device-related failure corresponding to playing the portion of media content;
determine a solution for the CPE device-related failure; and
automatically cause one or more actions included in the solution to be performed to dynamically remediate the CPE device-related failure.

* * * * *